（12）United States Patent
Tada

(10) Patent No.: US 8,325,496 B2
(45) Date of Patent: Dec. 4, 2012

(54) SWITCHING POWER SUPPLY CIRCUIT AND SURGE ABSORBING CIRCUIT

(75) Inventor: Nobuhiro Tada, Iruma (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 223 days.

(21) Appl. No.: 12/083,964

(22) PCT Filed: Dec. 21, 2006

(86) PCT No.: PCT/JP2006/325525
§ 371 (c)(1),
(2), (4) Date: Apr. 23, 2008

(87) PCT Pub. No.: WO2007/074711
PCT Pub. Date: Jul. 5, 2007

(65) Prior Publication Data
US 2009/0257247 A1 Oct. 15, 2009

(30) Foreign Application Priority Data

Dec. 27, 2005 (JP) ................................ P2005-375148

(51) Int. Cl.
*H02M 3/335* (2006.01)
*G05F 1/577* (2006.01)
(52) U.S. Cl. ............................ 363/17; 323/267; 363/126
(58) Field of Classification Search .................. 323/267;
363/17, 18, 20, 21.02, 21.04, 21.06, 21.12,
363/21.14, 56.02, 56.03, 56.05, 56.08, 56.1,
363/56.12, 126, 127; 307/11, 35
See application file for complete search history.

(56) References Cited

U.S. PATENT DOCUMENTS

| 3,859,590 | A | * | 1/1975 | Cielo et al. ..................... 323/290 |
| 5,541,828 | A | * | 7/1996 | Rozman ....................... 363/21.1 |
| 6,072,709 | A | * | 6/2000 | Raets .............................. 363/93 |
| 6,160,727 | A | * | 12/2000 | Liao et al. ..................... 363/125 |
| 6,198,640 | B1 | * | 3/2001 | Wiseman ....................... 363/26 |
| 6,469,479 | B2 | * | 10/2002 | Kim ............................... 323/267 |
| 7,518,263 | B2 | * | 4/2009 | Gan et al. ....................... 307/32 |

FOREIGN PATENT DOCUMENTS

| JP | 9-224374 | 8/1997 |
| JP | 2001-292573 | 10/2001 |
| JP | 2002-218749 | 8/2002 |
| JP | 2002-374674 | 12/2002 |
| JP | 2005-318686 | 11/2005 |

* cited by examiner

*Primary Examiner* — Gary L Laxton
(74) *Attorney, Agent, or Firm* — Nixon & Vanderhye PC

(57) ABSTRACT

Provided is a switching power supply device capable of effectively improving power supply efficiency with a small number of parts. The switching power supply device includes: a switching circuits (S1 to S4) for converting DC input power into AC power, a transformer (T) having a primary winding to which the AC power is supplied, first rectifiers (D21, D22) for rectifying the AC power induced by the secondary winding of the transformer into DC power, second rectifiers (D31, D32) having anodes connected to cathodes of the first rectifiers, and a capacitor (C) connected between the cathodes of second rectifiers and a predetermined potential node and functioning as an auxiliary power source of a predetermined load (F). Surge generated at the cathodes of the first rectifiers (D21, D22) of the secondary side during switching is supplied to the capacitor (C) via the second rectifiers (D31, D32). The load (F) uses power charged in the capacitor as an operation power source.

4 Claims, 6 Drawing Sheets

SWITCHING POWER SUPPLY CIRCUIT AND SURGE ABSORBING CIRCUIT

This application is the U.S. national phase of International Application No. PCT/JP2006/325525 filed 21 Dec. 2006 which designated the U.S. and claims priority to Japanese Patent Application No. 2005-375148 filed 27 Dec. 2005, the entire contents of each of which are hereby incorporated by reference.

TECHNICAL FIELD

The present invention relates to a switching power supply device and a surge absorbing circuit, in particular, to a technique for suppressing a surge generated in a rectifier provided on a secondary side of a transformer provided in the switching power supply device.

Priority is claimed on Japanese Patent Application No. 2005-375148, filed on Dec. 27, 2005, the contents of which are incorporated herein by reference.

BACKGROUND ART

FIG. 4 shows a configuration of a conventional switching power supply device. The switching power supply device shown in this diagram is configured with: an input capacitor Cin, switches S1 to S4, a transformer T, diodes D21 and D22, an output winding L23, and an output capacitor Cout.

According to this switching power supply device, direct current (DC) input power at a predetermined voltage (Vin) applied between an input terminal TIN1 and an input terminal TIN2 is converted into alternating current (AC) power once by a switching operation of a full bridge circuit comprising the switches S1 to S4, and is then supplied to a primary winding L1 of a transformer T.

Due to the alternating current power having been supplied to the primary winding L1 of the transformer T, alternating current power at a predetermined voltage is induced in secondary windings L21 and L22 of the transformer T. This induced alternating current power is converted into DC power again by the main diodes D21 and D22, and is then externally outputted via the output winding L23 and an output terminal TOUT1 as direct current power at a predetermined voltage (Vout).

Incidentally, according to the switching power supply device mentioned above, when the direction of electric current flowing through the secondary windings L21 and L22 is switched, a surge shown in FIG. 5 caused by a leakage magnetic flux or the like between the primary side and the secondary side of the transformer T is generated on the cathode side of the main diodes D21 and D22.

Generally, this surge can be improved to some extent by providing a CR snubber circuit along with the main diodes D21 and D22. However, the basic principle of a CR snubber circuit is such that a resistance element consumes electric power and a surge is thereby absorbed. Therefore, it essentially causes an electric power loss, leading to reduced power supply efficiency. In particular, if the number of main diodes on the secondary side is increased, the number of CR snubber circuits to be provided along with the main diodes also increases. As a result, the electric power loss further increases.

As a technique for solving such a problem of the CR snubber circuit, there has been proposed a lossless snubber circuit that accumulates surge energy in a coil once and then discharges to an output side (refer to Patent Document 1).

Patent Document 1: Japanese Unexamined Patent Application, First Publication No. Hei 09-224374

DISCLOSURE OF THE INVENTION

Problems to be Solved by the Invention

However, according to the lossless snubber circuit of the above mentioned conventional technique, there are a large number of component parts, and a large number of elements lie on an electric current path up to the point where a surge is discharged to the output side. Therefore there is a problem in that power loss in the elements is manifest, so there is a limit to improving power supply efficiency.

The present invention takes the above circumstances into consideration with an object of providing a switching power supply device and a surge absorbing circuit that can be configured with a small number of component parts, and are capable of effectively improving power supply efficiency.

Means for Solving the Problems

A switching power supply device according to the present invention includes: a switching circuit (S1 to S4) for converting DC input power into AC power by means of a switching operation; a transformer (T) having a primary winding to which the alternating current power is supplied; a first rectifier (D21 and D22) that rectifies AC power induced in a secondary winding of the transformer into DC power; a second rectifier (D31 and D32) having an anode connected to a cathode of the first rectifier; and a capacitor (C) that is connected between a cathode of the second rectifier and a node of a predetermined potential and that functions as an auxiliary power supply for a predetermined load.

Here, the switching circuit is characterized in that it may be any one of a full bridge circuit, a half bridge circuit, a one transistor forward circuit, and an RCC circuit, for example.

Moreover, the switching circuit may be provided with a transistor (switch) instead of the first rectifier, and configured such that the transistor performs synchronous rectification on alternating current power induced in the secondary winding of the transformer.

According to the above configuration of the present invention, a surge generated in the cathode of the first rectifier is supplied to the capacitor via the second rectifier so as to charge this capacitor. The capacitor supplies the load with operating power. Therefore, the switching power supply device can be configured with a small number of component parts, and it becomes possible to effectively improve power supply efficiency. Furthermore, according to the configuration with the transistor instead of the first rectifier, when performing synchronous rectification, a surge generated in the transistor can be absorbed by the capacitor (C). As a result, power supply efficiency can be similarly improved.

A surge absorbing circuit according to the present invention is a surge absorbing circuit for absorbing a surge generated in a main rectifier that rectifies alternating current power induced in a secondary winding of a transformer provided in a switching power supply device, and includes: a rectifier (D31 and D32) having an anode connected to a cathode of the main rectifier; and a capacitor (C) that is connected between the cathode of the rectifier and a node of a predetermined potential and that functions as an auxiliary power supply for a predetermined load (F).

According to this configuration, a surge generated in the cathode of the main rectifier of the switching power supply device is supplied to the capacitor via the rectifier provided in this surge absorbing circuit so as to charge this capacitor. The capacitor supplies the load with operating power.

Effect of the Invention

The switching power supply circuit and the surge absorbing circuit of the present invention enable effective surge suppression with a simple configuration while suppressing power loss to an extremely low level. Therefore by using the circuit of the present invention as a power supply circuit, it is possible to effectively improve power supply efficiency.

BRIEF DESCRIPTION OF THE REFERENCE SYMBOLS

Cin Input capacitor
Cout Output capacitor
C Capacitor
D21, D22 Main diode
D31, D32 Diode
F Load
L1 Primary winding
L21, L22 Secondary winding
L23 Output winding
S1 to S4 Switch
TIN1, TIN2 Input terminal
TOUT1, TOUT2 Output terminal
S21, S22 FET Transistor

BEST MODE FOR CARRYING OUT THE INVENTION

Hereinafter, an embodiment of the present invention is described, with reference to the drawings.

Figure 1:
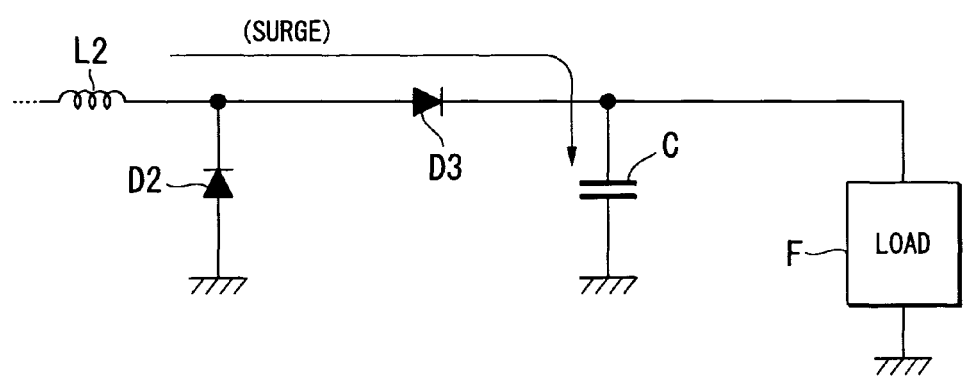
FIG. 1 is a diagram for explaining the principle of a surge absorbing circuit provided in a switching power supply device according to an embodiment of the present invention.

First, with reference to FIG. 1, there is described the principle of a surge absorbing circuit provided in a switching power supply device according to the embodiment of the present invention.

Figure 2:
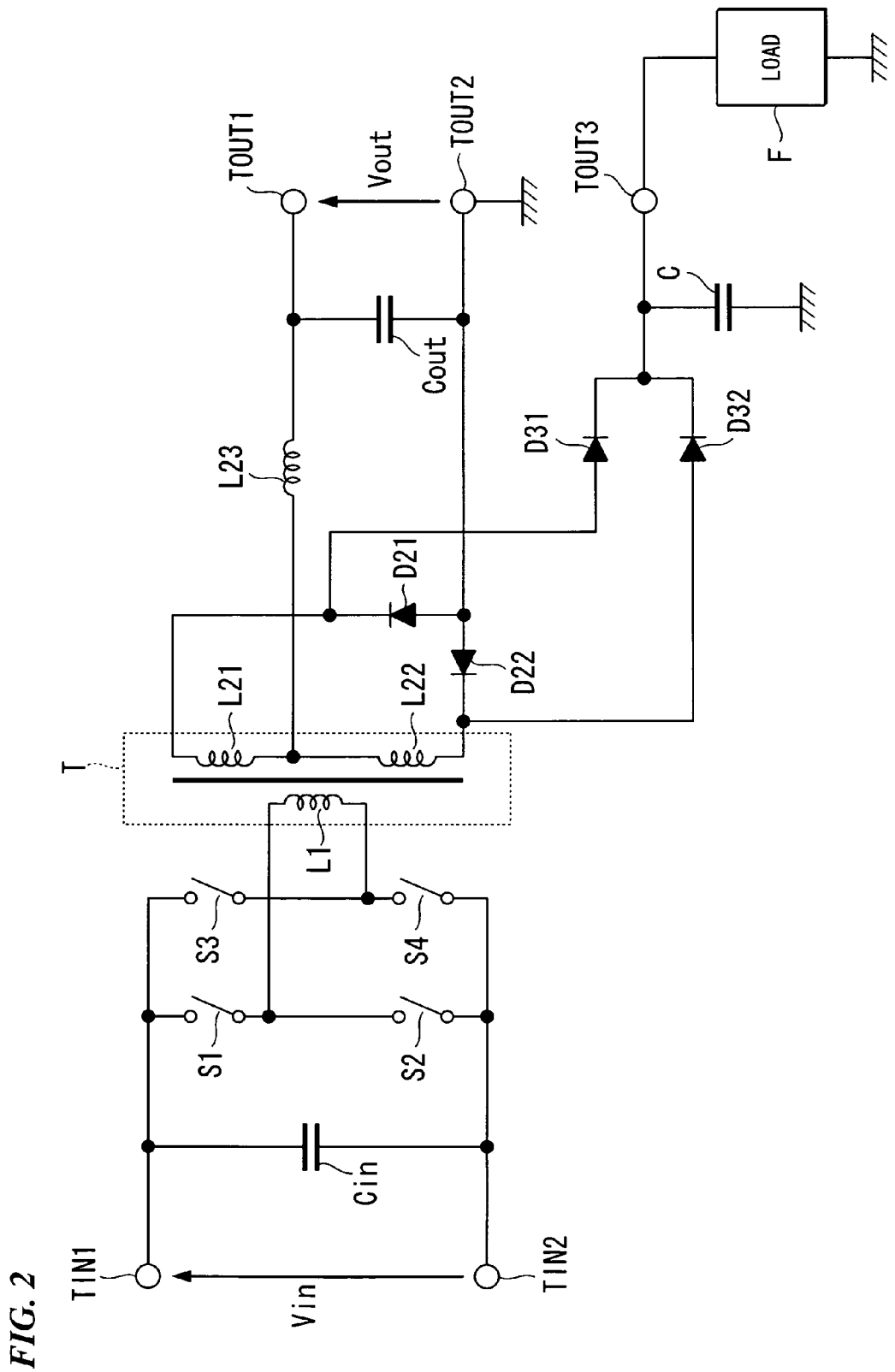
FIG. 2 is a circuit diagram showing an example of configuring the switching power supply device and the surge absorbing circuit according to the embodiment of the present invention.

In FIG. 1, a diode D2 corresponds to main diodes D21 and D22 provided on the secondary side shown in FIG. 2. A diode D3 and a capacitor C configure a surge absorbing circuit according to the present invention. A predetermined load F is an arbitrary apparatus that operates with a capacitor C as an auxiliary power supply, and the content thereof is not particularly limited.

Figure 5:
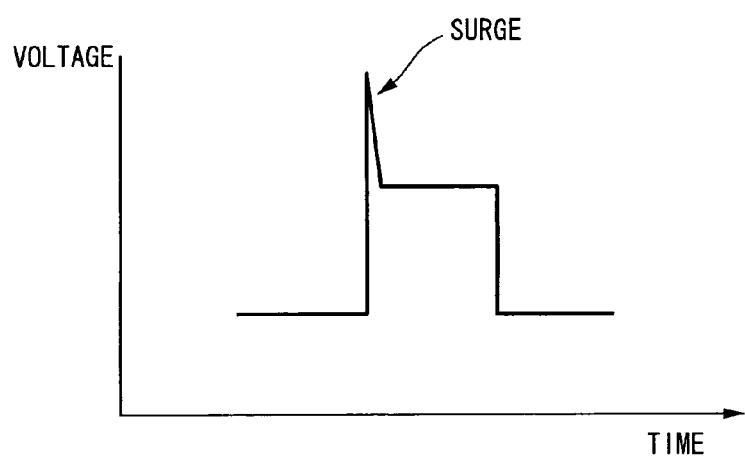
FIG. 5 is a diagram for explaining problems of the switching power supply device according to the conventional technique.

In FIG. 1, when the above described surge shown in FIG. 5 generates on the cathode side of the diode D2, this surge is supplied to the capacitor C via the diode D3 so as to charge this capacitor C. In other words, the surge electric power is accumulated in the capacitor C. The electric power accumulated in this capacitor C is supplied as an auxiliary power supply to the load F. Therefore, the surge that has generated in the diode D2 is effectively used as operating power of the load F, thereby improving power supply efficiency.

Figure 4:
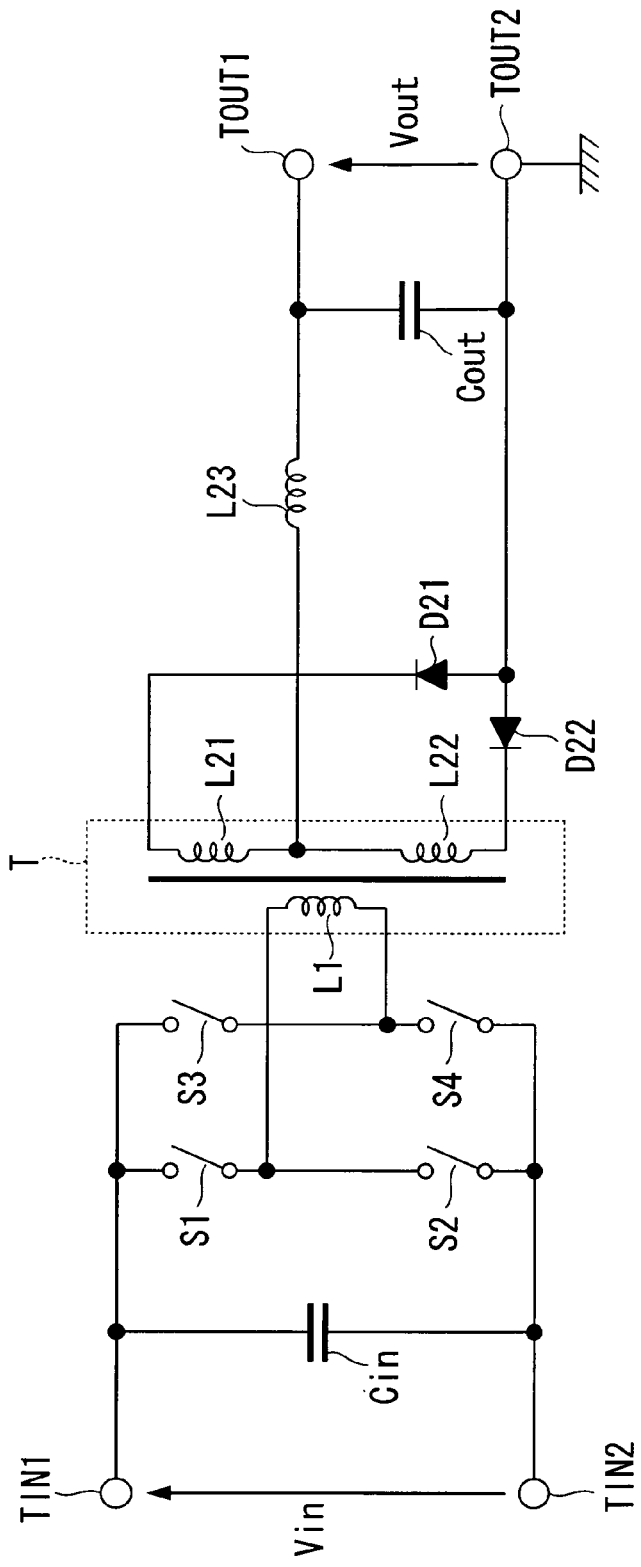
FIG. 4 is a circuit diagram showing a configuration of a switching power supply device according to a conventional technique.

FIG. 2 shows an example of a configuration of the switching power supply device to which the above mentioned surge absorbing circuit shown in FIG. 1 is applied. In this diagram, the same reference symbols are given to components the same as the aforementioned components shown in FIG. 4.

The switching power supply device shown in FIG. 2 is, compared with the configuration shown in FIG. 1, further provided with diodes D31 and D32, an electrolytic capacitor C, and a load F. Among these, the diodes D31 and D32 and the electrolytic capacitor C configure the surge absorbing circuit of this switching power supply device.

Here, to describe the configuration in further detail, between an input terminal TIN1 and an input terminal TIN2, there is connected an input capacitor Cin, a switch S1 and a switch S2 connected in series in this order, and a switch S3 and a switch S4 connected in series in this order. To a connection point between the switch S1 and the switch S2, there is connected one end of a primary winding L1 of a transformer T, and to a connection point between the switch S3 and the switch S4, there is connected an other end of the primary winding L1.

One end of a secondary winding L21 of the transformer T is connected, together with one end of a secondary winding L22, to an output terminal TOUT1 via an output winding L23. The other end of the secondary winding L21 is connected to the cathode of the main diode D21, and the other end of the secondary winding L22 is connected to the cathode of the main diode D22. The respective anodes of these main diodes D21 and D22 are grounded (predetermined potential node) via an output terminal TOUT2. Between the output terminal TOUT1 and the output terminal TOUT2, there is connected an output electrolytic capacitor Cout. A secondary winding L2 (shown in FIG. 1) corresponds to the above-described secondary windings L21 and L22 of the transformer T shown in FIG. 2.

The anode of the diode D31 is connected to the cathode of the diode D21, the anode of the diode D32 is connected to the cathode of the diode D22. Moreover, the respective cathodes of the diodes D31 and D32 are commonly connected to an output terminal TOUT3, and between the respective cathodes (that is, the output terminal TOUT3) of these diodes D31 and D32 and the ground (predetermined potential node), there is connected the electrolytic capacitor C.

Next, there is described an operation of the switching power supply device according to the present embodiment.

A full bridge circuit formed with the switches S1 to S4 performs a predetermined switching operation (known switching operation) so that DC input power that has been supplied via the input terminal TIN1 is converted into AC power so as to be supplied to the primary winding L1 of the transformer T. As a result, an alternating electric current is generated in the primary winding L1, and mutually inverse-phase electric currents are respectively induced in the secondary windings L21 and L22 of the transformer T. These alternating currents induced on the secondary side are rectified by the main diodes D21 and D22, and are then externally outputted via the output winding L23 and the output terminal TOUT1.

Here, when the direction of the alternating current flowing through the primary winding L1 is switched and the directions of the respective electric currents flowing through the secondary windings L21 and L22 are switched, a surge generated on the cathode side of a diode, among the main diodes D21 and D22, that has shifted from the forward bias state to the reverse bias state. For example, if a surge generated on the cathode side of the main diode D21, then this surge is supplied to the electrolytic capacitor C via the diode D31 so as to charge this electrolytic capacitor C. Similarly, if a surge is generated on the cathode side of the main diode D22, then this surge is supplied to the electrolytic capacitor C via the diode D32 so as to charge the electrolytic capacitor C.

As a result, the electric power of the respective surges that have generated in the main diodes D21 and D22 are accumulated in the electrolytic capacitor C. The electric power accumulated in the electrolytic capacitor C is supplied to the load F via the output terminal TOUT3. That is to say, the electrolytic capacitor C functions as an auxiliary power source of the load F.

The load F is also supplied by the main power supply. However, by having the electrolytic capacitor C function as an auxiliary power source, a main power supply deficiency is appropriately supplemented.

Figure 3:
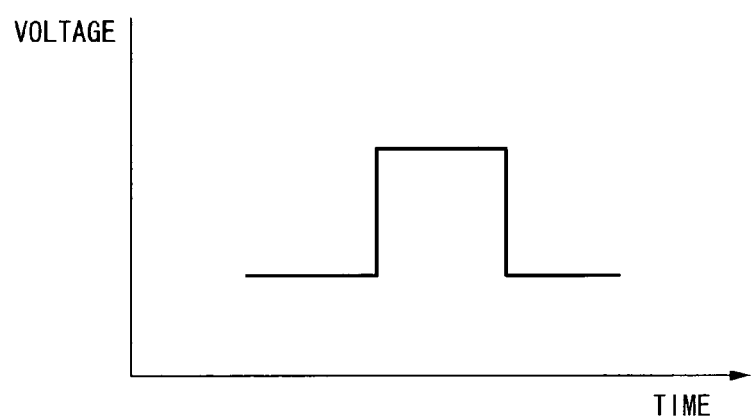
FIG. 3 is a diagram for explaining problems that the switching power supply device according to the embodiment of the present invention has solved.

According to the present embodiment, the respective surges that have generated on the cathode side of the main diodes D21 and D22 are immediately used for charging the electrolytic capacitor C via the diodes D31 and D32. Therefore in effect, the surge is not actualized on each cathode side of the main diodes D21 and D22. That is to say, as shown in FIG. 3, the respective surges that have generated on the cathode side of the main diodes D21 and D22 merely pass though one step of diodes D31 and D32 until they are supplied to the electrolytic capacitor C. Therefore, there are a small number of elements on a path through which the surges pass, and it is possible to minimize a loss that occurs while these surges are passing through the elements. Furthermore, the electric power of the surge accumulated in the electrolytic capacitor C is effectively used as operating power of the load F. As a result, on the whole, it is possible to effectively suppress a loss in electric power, thereby effectively improving power supply efficiency.

The embodiment of the present invention has been described. However, the present invention is not limited to the above described embodiment, and modifications may be appropriately made without departing from the spirit or scope of the invention.

For example, the switching circuit on the primary side of the transformer T is configured as a full bridge circuit in the above embodiment. However, it is not limited to this configuration, and the type of the switching circuit on the primary side may be any of a half bridge circuit, a one transistor forward circuit, an RCC circuit, or the like.

Figure 6:
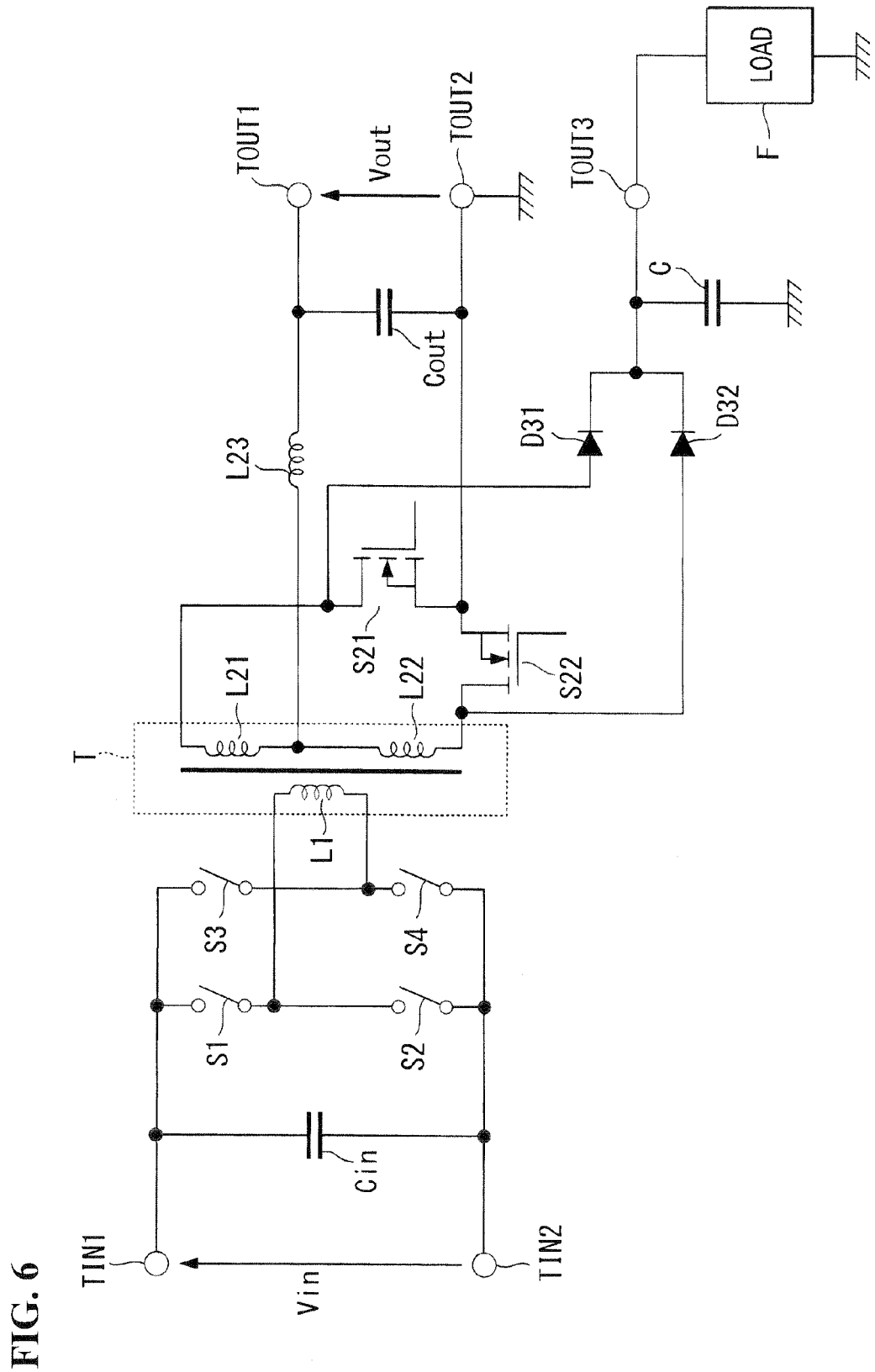
FIG. 6 is a diagram showing a switching power supply device as in FIG. 2, but with two FET transistors replacing two rectifiers.

Moreover, in the above embodiment, the main diodes D21 and D22 are provided on the secondary side, and rectification is to be carried out by these main diodes. However, instead of these main diodes switching devices such as transistors may be provided, to thereby perform synchronous rectification. For example, as shown in FIG. 6, diodes D21 and D22 have been replaced by FET transistors S21 and S22. In this case, a surge generated in the transistors when carrying out synchronous rectification is absorbed by the electrolytic capacitor C via the diodes D31 and D32. Therefore, it is possible to similarly improve power supply efficiency.

Furthermore, instead of the electrolytic capacitor C, another type of capacitor may be employed.

Industrial Applicability

A switching power supply circuit and a surge absorbing circuit of the present invention can be simply configured with a small number of parts and enable effective surge suppression while suppressing power loss to an extremely low level. Therefore by using the power supply circuit and the surge absorbing circuit of the present invention as a power supply device, electric voltage can be stabilized and surges can be absorbed, thereby enabling a significant improvement in power supply efficiency.

The invention claimed is:

1. A switching power supply device comprising:
 a switching circuit that converts DC input power into AC power by means of a switching operation;
 a transformer having a primary winding to which said AC power is supplied;
 a secondary winding;
 a first rectifier that rectifies AC power induced in said secondary winding of said transformer into direct current power, said first rectifier having an anode connected to a ground;
 a second rectifier having an anode connected to a cathode of said first rectifier;
 a capacitor that has a first end connected to a cathode of said second rectifier and a second end connected to the ground and that functions as an auxiliary power supply for a load; and
 an output terminal that is connected to said secondary winding via an output winding,
 wherein one end of the secondary winding of said transformer is connected to the cathode of said first rectifier and the anode of said second rectifier.

2. A switching power supply device according to claim 1, wherein said switching circuit is any one of a full bridge circuit, a half bridge circuit, a one transistor forward circuit, and an RCC circuit.

3. A switching power supply device according to claim 1, provided with a transistor instead of said first rectifier, and configured such that said transistor performs synchronous rectification on AC power induced in the secondary winding of said transformer.

4. A surge absorbing circuit comprising:
 a secondary winding;
 a first rectifier that rectifies AC power induced in the secondary winding of a transformer provided in a switching power supply device into direct power, said first rectifier having an anode connected to a ground;
 a second rectifier having an anode connected to a cathode of said first rectifier;
 a capacitor that has a first end connected to a cathode of said second rectifier and a second end connected to the ground and that functions as an auxiliary power supply for a load; and
 an output terminal that is connected to said secondary winding via an output winding,
 wherein one end of the secondary winding of the transformer is connected to the cathode of said first rectifier and the anode of said second rectifier.

* * * * *